Dec. 17, 1929.  W. E. VAN LUE  1,740,050
APPARATUS FOR AND METHOD OF CLOSING AND STRAIGHTENING TIRE BEAD TAPE
Filed March 26, 1928  3 Sheets-Sheet 1
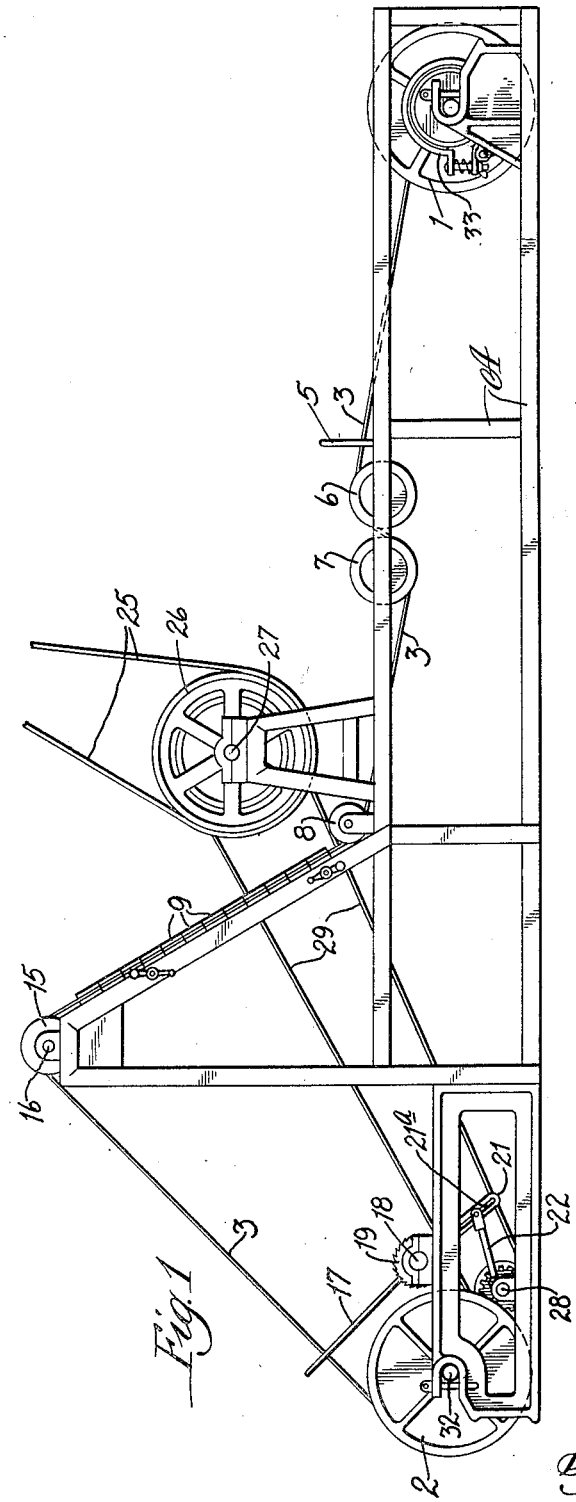
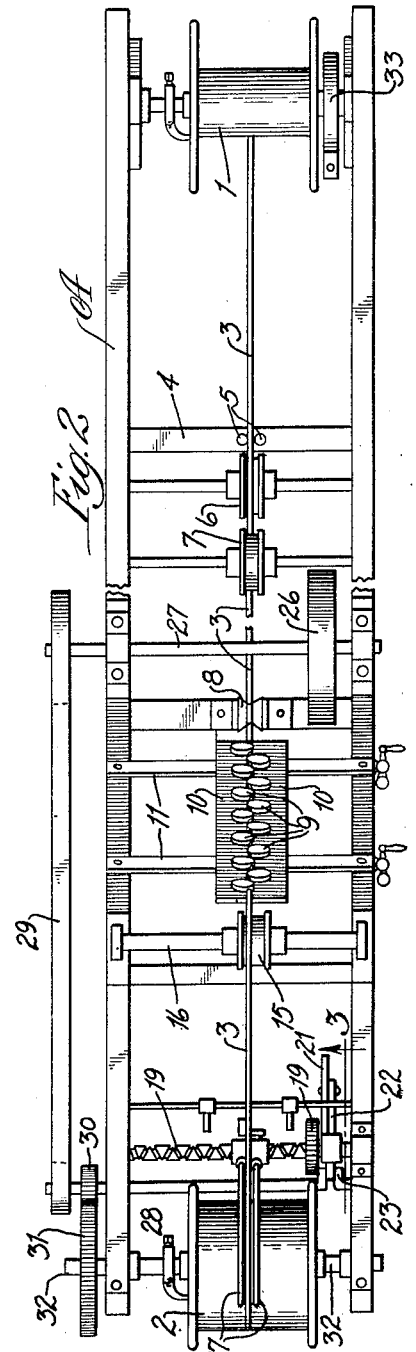

Dec. 17, 1929.   W. E. VAN LUE   1,740,050
APPARATUS FOR AND METHOD OF CLOSING AND STRAIGHTENING TIRE BEAD TAPE
Filed March 26, 1928   3 Sheets-Sheet 2
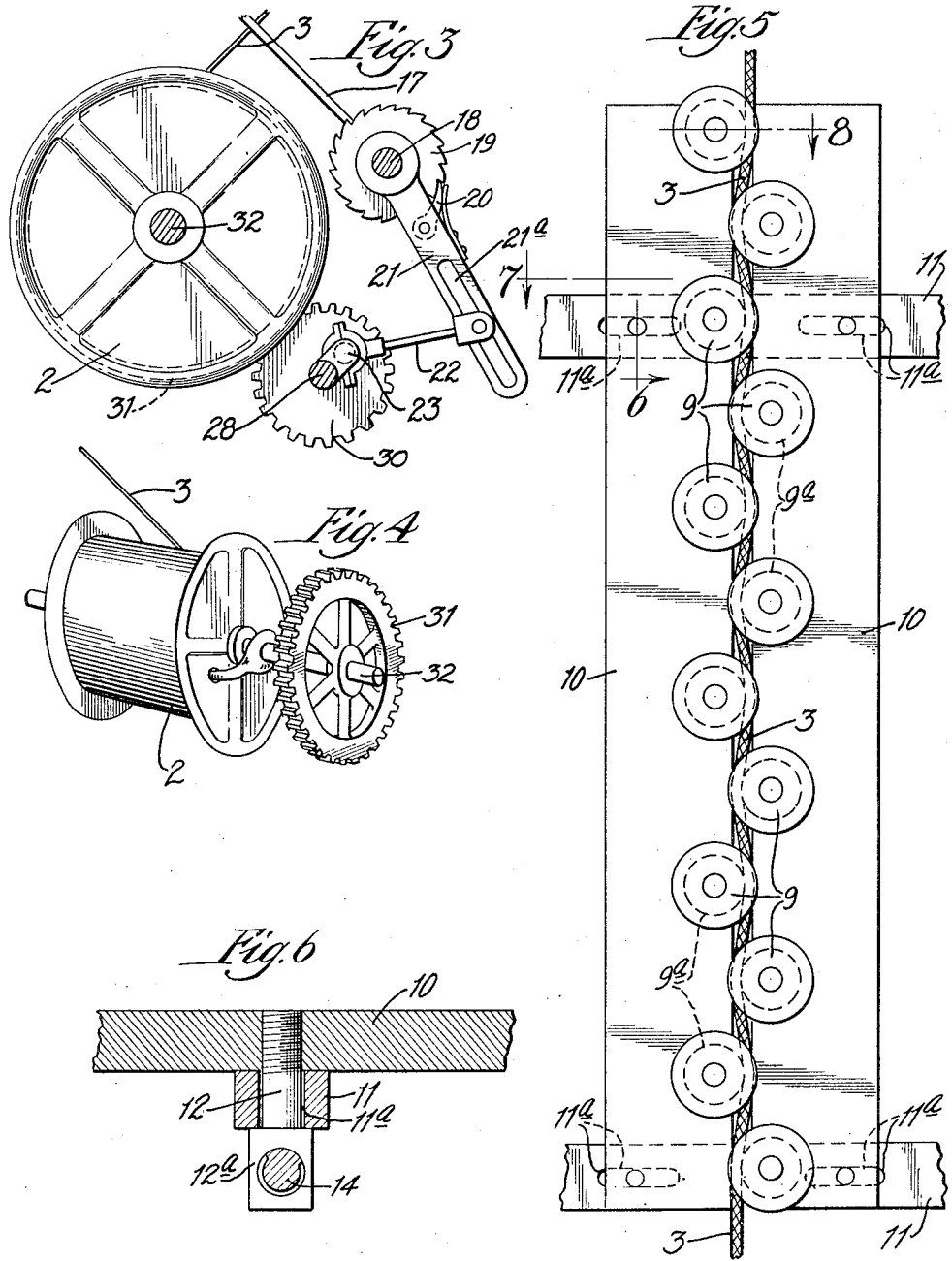

Dec. 17, 1929.  W. E. VAN LUE  1,740,050
APPARATUS FOR AND METHOD OF CLOSING AND STRAIGHTENING TIRE BEAD TAPE
Filed March 26, 1928  3 Sheets-Sheet 3
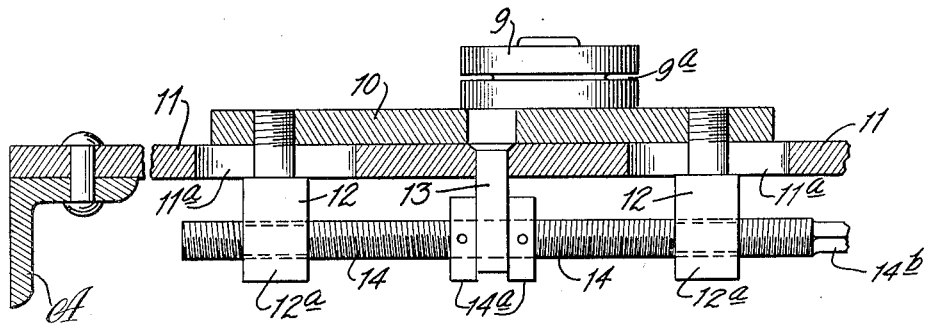
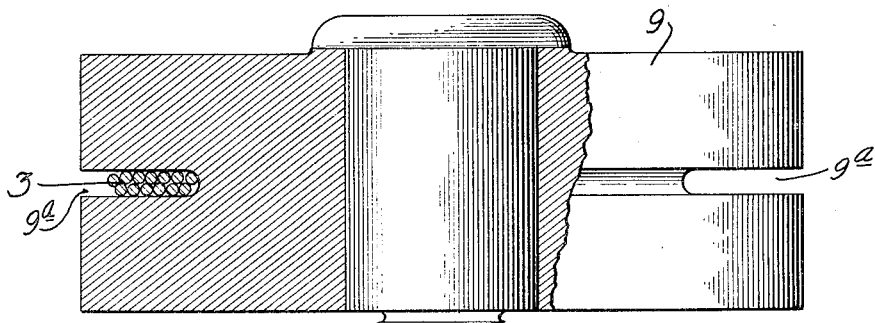
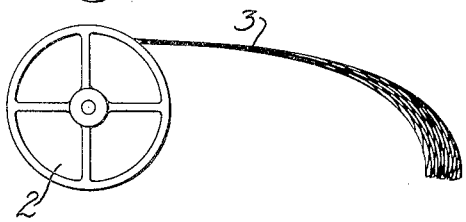
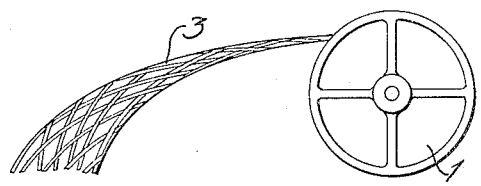

Patented Dec. 17, 1929

1,740,050

UNITED STATES PATENT OFFICE

WILLIAM E. VAN LUE, OF NILES, MICHIGAN, ASSIGNOR TO NATIONAL STANDARD COMPANY, OF NILES, MICHIGAN, A CORPORATION OF MICHIGAN

APPARATUS FOR AND METHOD OF CLOSING AND STRAIGHTENING TIRE-BEAD TAPE

Application filed March 26, 1928. Serial No. 264,592.

This invention relates to improvements in apparatus for and method of closing and straightening tire bead tape, and is here shown as applied to a tire bead re-enforcing tape made of a plurality of wires braided together.

It has been found that the strands of braided wire tape of the type referred to are ordinarily somewhat separated as the tape comes from the braiding machine. One of the features of my invention is to provide apparatus for and method of closing the strands, or bringing them closer together, in order to make a firmer and more compact tape which is less extensible than if the strands were somewhat separated.

Another feature of my invention is the provision of means and method for straightening a tape of the character referred to. Such a tape as it comes from the braiding machine is frequently more or less bent or curved. In the practice of my invention, this tape is straightened out so as to make it better adapted for use in tire bead construction.

It has been found desirable, also, in preparing such tape for shipment to reverse or rewind the same end for end with respect to the way in which it is wound on the receiving reel of the braiding machine. In the practice of my invention, I have found that the closing and straightening operations above referred to can be well carried out at the same time that the tape is thus being reversed or rewound end for end.

In that form of device embodying the features of my invention shown in the accompanying drawings, Figure 1 is a view in side elevation, Fig. 2 is a top plan view, Fig. 3 is a view taken as indicated by the line 3 of Fig. 2, Fig. 4 is a view in perspective of the receiving reel, Fig. 5 is a top plan view of the closing and straightening rolls, Fig. 6 is a view taken as indicated by the line 6 of Fig. 5, Fig. 7 is a view taken as indicated by the line 7 of Fig. 5, Fig. 8 is a view taken as indicated by the line 8 of Fig. 5, Fig. 9 is a view of the receiving reel, Fig. 10 is a view of the feed reel, Fig. 11 is a sectional view of the tape showing the strands closed after going through the machine, and Fig. 12 is a similar view showing the tape before going through the machine with the strands opened or separated.

A indicates a suitable frame supporting at one end the feed-reel 1 and at the other end the receiving-reel 2. The feed-reel 1, for example, may be the receiving-reel of the braiding machine. Ordinarily, it is not desirable to ship the tape to the user on this reel as it preferably should first be rewound so that in the process of manufacturing the tire bead the other end of the tape will be available for use. Consequently, I have here shown the tape as being rewound from the reel 1 to the reel 2 on which it is shipped to the user.

During the rewinding of the tape from the reel 1 to the reel 2, the closing and straightening operations are performed, as will be described hereinafter.

3 indicates the tape which is led from the feed reel 1 over the bar 4 between the guide posts 5, 5. From this point, the tape passes over roller 6 and under a similar roller 7, thence under a guide roller 8, whence it is led to the closing and straightening rolls. 9, 9, indicate two rows of straightening and closing rolls provided with deep narrow peripheral grooves 9$^a$ to accommodate the tape (see Fig. 8). There are two rows of these rolls staggered with respect to each other, each roll being mounted on a plate 10. The plates 10 are adjustably mounted on cross-bars 11 carried by the frame A. The rolls 9 are mounted near the adjacent edges of the plates 10, and in order to permit adjustment of the plates thereof toward and away from each other on the supporting bars 11, such supporting bars are provided with slots 11$^a$ through which project the screws 12 which are threaded into the plates 10. The bar 11 is provided near its center with a post 13 carrying rotatably mounted therein the double threaded bolt or turn buckle 14 having its ends threaded in the heads 12$^a$ of each pair of screws 12. The bar 14 is provided with two collars 14$^a$, 14$^a$, one lying on each side of the post 13 to prevent lateral movement of the bar with respect to the post. The buckle 14 is adapted to be turned by means of the squared end 14$^b$ in order to move the plates 10, 10, toward or away from each other. The plates are preferably adjusted as shown in Fig. 5 so that the tape 3 in passing between the opposed rows of rollers will be given a series of opposed lateral bends as it is fed through. The grooves 9ª in the rollers are narrow enough to hold the tape substantially in the same plane as it is given these bends. It has been found that thus bending the tape serves to close the strands thereof and straighten the tape. For example, the strands of the tape may be somewhat as shown in Fig. 12 before passing between the rolls 9; and upon leaving these rolls the strands will be closed so that they appear somewhat as shown in Fig. 11.

After the tape leaves the rolls 9 it passes over the rollers 15 mounted on the shaft 16 carried at the top of frame A. From the roller 15 it is led downwardly to the receiving reel 2.

I preferably provide means for winding the tape evenly and neatly on the reel 2. This may comprise a pair of guiding fingers 17 between which the tape is fed. These fingers are mounted for reciprocatory travel on the double screw 18 which may be driven in any suitable manner, for example by means of the toothed wheel 19, the teeth of which are engaged by a spring pressed pawl 20 on the oscillating arm 21 adapted to be driven by a connecting rod 22 fastened to the end of a crank 23 on the shaft 28. The end of the connecting rod 22 is provided for adjustment in a slot 21ª at the end of the arm 21 in order to vary the speed of rotation of the double screw 18 and consequently vary the rate of movement of the guiding fingers 17.

The apparatus may be driven in any suitable manner. For example, a belt 25 may drive the belt-wheel 26 on the shaft 27, which in turn may drive the shaft 28 by means of the belt 29. The shaft 28 may be provided with a pinion 30 meshing with the pinion 31 on the shaft 32 carrying the receiving reel 2. In order to drive the connecting rod 22, the shaft 28 may be provided with a crank 23 as above described.

The feed reel 1 is preferably provided with a suitable retarding brake 33 in order to keep the tape from being fed therefrom too rapidly.

The separation of the plates 10 carrying the rolls 9 must be adjusted in order to give the desired results. The exact distance between the rolls 9, 9, both longitudinally and laterally may depend upon the size and kind of tape being treated. The best results can be found by experimentation. I have found it preferable to adjust the lower ends of the plates 10 slightly closer together than the upper ends.

I have also found that in practicing the invention on a braided tape where one of the strands is woven from one edge of the tape to the other in a length of tape about two and three-quarters inches, that I get good results by separating opposed adjacent rollers on the two plates 10 longitudinally a distance of about three inches. In Fig. 5, I have attempted to show an adjustment between the plates 10, 10, which has given good results in closing and straightening a tape.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. The process of closing a flat tape of the character described consisting of giving the tape a series of alternate opposed lateral bends in its own plane.

2. Apparatus of the character described comprising; two opposed staggered rows of rolls with deep narrow grooves having parallel side walls; and means for feeding a tape through the grooves between the two rows of rolls, said rows being close enough together to give the tape a series of alternate opposed lateral bends as it is fed through.

3. Apparatus of the character described comprising; two opposed staggered rows of rolls with deep narrow grooves having parallel side walls, said grooves lying substantially in the same plane; and means for feeding a tape through the grooves between the two rows of rolls, said rows being close enough together to give the tape a series of alternate opposed lateral bends as it is fed through.

4. Apparatus of the character described comprising; two opposed staggered rows of rolls with deep narrow grooves having parallel side walls; means for adjusting said rows toward and away from each other; and means for feeding a tape through the grooves between the two rows of rolls, said rows being close enough together to give the tape a series of alternate opposed lateral bends as it is fed through.

5. Apparatus of the character described comprising; two opposed staggered rows of rolls with deep narrow grooves having parallel side walls, said grooves lying substantially in the same plane; means for adjusting said rows toward and away from each other; and means for feeding a tape through the grooves between the two rows of rolls, said rows being close enough together to give the tape a series of alternate opposed lateral bends as it is fed through.

6. Apparatus of the character described comprising; two opposed staggered rows of rolls with deep narrow grooves; means for adjusting said rows toward and away from each other; means for adjusting the angular relation between said rows; and means for feeding a tape through the grooves between the two rows of rolls, said rows being close enough together to give the tape a series of opposed lateral bends as it is fed through.

7. Apparatus of the character described comprising; two opposed staggered rows of rolls with deep narrow grooves, said grooves lying substantially in the same plane; means for adjusting said rows toward and away from each other; means for adjusting the angular regulation between said rows; and means for feeding a tape through the grooves between the two rows of rolls, said rows being close enough together to give the tape a series of opposed lateral bends as it is fed through.

In witness whereof, I have hereunto set my hand this 17th day of March, 1928.

WILLIAM E. VAN LUE.